Nov. 20, 1962
R. E. HUPP
3,064,889
DECIMAL READOUT FOR BINARY NUMBERS
Filed Jan. 3, 1961
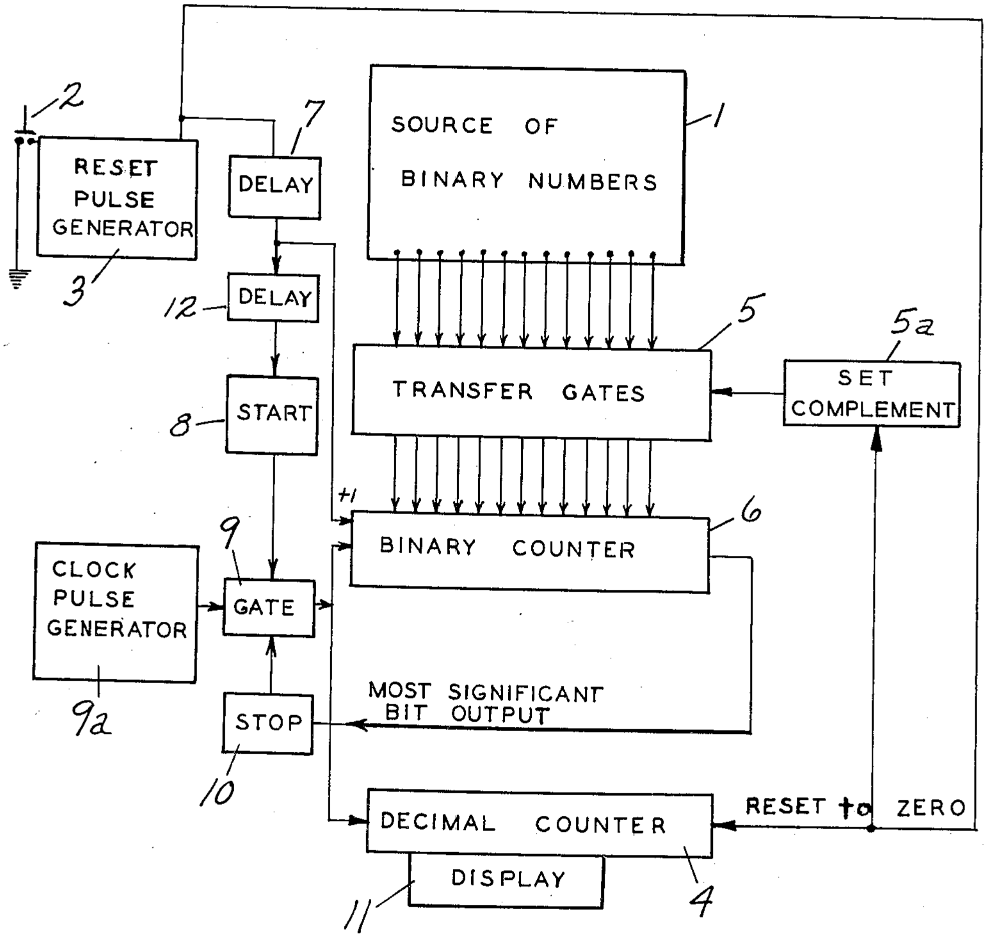
INVENTOR.
Ross E. Hupp
BY Ralph Hamman
attorney

United States Patent Office 3,064,889

Patented Nov. 20, 1962

3,064,889

DECIMAL READOUT FOR BINARY NUMBERS

Ross E. Hupp, Los Angeles, Calif., assignor, by mesne assignments, to Eldorado Electronics Company, a company of California Filed Jan. 3, 1961, Ser. No. 80,457

1 Claim. (Cl. 235—92)

In computers, and similar equipment working on the binary number system, it is frequently desirable to readout or display the decimal equivalent or counterpart of a binary number as it exists at any particular time. Direct conversion from a large (many bit) binary number to a decimal display is so complicated that it is impractical. The idea behind this system is that with standard equipment, the decimal equivalent can be easily obtained.

In this system, a binary counter comprising a series of flip flops is set to the complement of the corresponding bit of the binary number whose decimal counterpart is to be displayed and a decimal counter is set to zero. Then one count is added to the binary complement. A start control opens a gate, allowing clock pulses to flow simultaneously to the binary and decimal counters. The decimal counter counts clock pulses up from zero. The binary counter counts clock pulses up from the complement plus 1 to its maximum capacity and when it reaches its maximum capacity, the output from its most significant bit flip flop actuates a stop control to close the gate. At this time, the decimal counter indicates the decimal equivalent of the binary number.

In the drawing, the single FIGURE is a circuit diagram.

In the diagram, 1 indicates the source of a binary number. This could be any source. The number could be arbitrarily varied from time to time.

When the binary number existing in source 1 is to be read out or displayed as its decimal equivalent, a start control is actuated, such as push button 2 or any other suitable control, manual or automatic. This actuates reset pulse generator 3 which resets decimal counter 4 to zero and at the same time through complement set 5*a* and transfer gates 5 sets each flip flop of the binary counter to the complement, then one count is added after a delay period of the binary number then existing in source 1. The reset pulse generator also actuates start control 8 through delays 7 and 12 so that the counters 4 and 6 are set and the plus 1 count is added to counter 6 before the operation of the start control 8. The start control 8 opens a gate 9 and allows pulses from a clock pulse generator 9*a* to pass through the gate to both the decimal and binary counters. Both counters count the number of clock pulses passing through the gate. The decimal counter 4 counts up from zero and at the same time the binary counter 6 counts up from the complement plus 1 count entered by 5, 5*a* and 12. When the binary counter reaches the whole number, that is, the maximum capacity for which the counter is designed, the most significant bit output actuates stop control 10 to close the gate. At this time, the decimal equivalent of the binary number in source 1 appears on the display 11 of decimal counter 4.

For example, in a system having a capacity of four decimal digits, if the decimal equivalent of a 13 bit binary number in source 1 is 125, the binary counter 6 is initially set to the binary complement of 125 or 8066. Then the plus 1 count is added by delay 7 for a total count of 8067. When the gate 9 is opened by the start control 8, a decimal counter counts up from zero and the binary counter counts up from the binary complement plus 1. When the decimal counter reaches 125, the binary counter reaches its maximum capacity of 8192 (8067+125) and the most significant bit output actuates the stop control 10 to close the gate 9.

The equipment for this system is standard and well known. It provides a simple arrangement for reading or displaying the decimal equivalent of a binary number as it exists at any time.

What is claimed as new is:

A system for displaying the decimal counterpart of a binary number as it exists in a source at a selected time comprising, a decimal counter including a reset and a readout or display for the registered count, a binary counter having a maximum capacity, transfer gates for entering in the binary counter the complement of the binary number to be displayed i.e. the difference between the maximum capacity of the binary counter and the binary number to be displayed, a clock frequency pulse generator, a gate connecting the clock pulse generator simultaneously to the binary and decimal counters, a start control, means actuated by the start control for actuating the reset of the decimal counter to reset it to zero and for actuating the transfer gates to enter in the binary counter the complement of the binary number existing in said source and for thereafter adding plus 1 to the count entered in the binary counter and then opening the gate between the clock pulse generator and the binary and decimal counters, the decimal counter counting up from zero the number of pulses of clock frequency passing through said gate, the binary counter counting up from said complement plus 1 the number of pulses of clock frequency passing through said gate, and a stop means for shutting said gate actuated in response to the most significant bit output of the binary counter when the count of the binary counter reaches the maximum capacity of the binary counter whereby the number then displayed on the decimal counter is the decimal equivalent of the binary number as it existed in said source.

References Cited in the file of this patent

UNITED STATES PATENTS

| | | |
|---|---|---|
| 2,757,862 | Boyden et al. | Aug. 7, 1956 |
| 2,772,048 | Collison et al. | Nov. 27, 1956 |
| 2,833,941 | Rosenberg | May 16, 1958 |
| 2,838,745 | Wright et al. | June 10, 1958 |
| 2,981,466 | Beall et al. | Apr. 25, 1961 |